(12) United States Patent
Kuriyagawa et al.

(10) Patent No.: US 11,197,423 B2
(45) Date of Patent: Dec. 14, 2021

(54) WORK EQUIPMENT WITH CONTAINER LIFTING DEVICE

(71) Applicant: HONDA MOTOR CO., LTD., Tokyo (JP)

(72) Inventors: Koji Kuriyagawa, Wako (JP); Runa Kaneko, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 260 days.

(21) Appl. No.: 16/470,417

(22) PCT Filed: Dec. 13, 2017

(86) PCT No.: PCT/JP2017/044728
§ 371 (c)(1),
(2) Date: Jun. 17, 2019

(87) PCT Pub. No.: WO2018/123593
PCT Pub. Date: Jul. 5, 2018

(65) Prior Publication Data
US 2019/0307072 A1   Oct. 10, 2019

(30) Foreign Application Priority Data
Dec. 26, 2016   (JP) .............................. JP2016-252060

(51) Int. Cl.
*A01D 43/063* (2006.01)
*A01D 34/64* (2006.01)

(52) U.S. Cl.
CPC ......... *A01D 43/0635* (2013.01); *A01D 34/64* (2013.01); *A01D 43/063* (2013.01)

(58) Field of Classification Search
CPC .. A01D 43/0635; A01D 34/64; A01D 43/063; A01D 43/0631; A01D 34/71;
(Continued)

(56) References Cited

U.S. PATENT DOCUMENTS

| 7,992,373 B2 * | 8/2011 | Ogata ................ A01D 43/0635 56/202 |
| 2009/0126328 A1 * | 5/2009 | Shimizu ............... A01D 43/063 56/16.6 |

(Continued)

FOREIGN PATENT DOCUMENTS

| DE | 20 2004 006 066 | 9/2004 |
| EP | 0 421 042 A1 | 4/1991 |

(Continued)

OTHER PUBLICATIONS

International Search Report, 2 pages.
(Continued)

*Primary Examiner* — Alicia Torres
*Assistant Examiner* — Matthew Ian Neal
(74) *Attorney, Agent, or Firm* — Rankin, Hill & Clark LLP

(57) ABSTRACT

An article such as grass clippings collected by work equipment, such as a lawn mower, and stored in a container is allowed to be transported to an area for discarding such a collected article in an energy and work efficient way without imposing any undue burden on the operator. A collected article container device provided with a collected article container and capable of traveling autonomously is detachably connected to a work equipment main body that has a work unit such as a cutting blade device and is able to travel, the container device being configured to travel in a detached state to a collected article destination by itself. The work equipment main body is provided with a container lifting device that lifts the container device in a connected state to the work equipment main body so as to raise the front and rear wheels from the ground.

18 Claims, 7 Drawing Sheets

(58) Field of Classification Search
CPC .......... A01D 2101/00; B60P 3/06; B60P 1/04; B62D 59/04; B62D 53/04
USPC .......................................................... 56/194
See application file for complete search history.

(56) References Cited

U.S. PATENT DOCUMENTS

| | | |
|---|---|---|
| 2009/0193777 A1 | 8/2009 | Wendling |
| 2012/0215381 A1 | 8/2012 | Wang et al. |
| 2015/0250099 A1* | 9/2015 | Holz ...................... A01D 34/00 56/202 |
| 2018/0037183 A1* | 2/2018 | Bartel .................. A01D 34/824 |

FOREIGN PATENT DOCUMENTS

| | | | |
|---|---|---|---|
| EP | 2559333 A1 * | 2/2013 | ............. A01D 43/07 |
| IT | B020090659 | 4/2011 | |
| JP | S63-80928 | 5/1988 | |
| JP | 4-29705 | 7/1992 | |
| JP | H05-158537 | 6/1993 | |
| JP | 2001-045829 | 2/2001 | |
| JP | 2003-189718 | 7/2003 | |
| JP | 2006-006144 | 1/2006 | |
| JP | 2010-148403 | 7/2010 | |
| JP | 2010-172241 | 8/2010 | |
| JP | 2013-000105 A | 1/2013 | |
| JP | 2013-031389 | 2/2013 | |
| JP | 2013-039094 | 2/2013 | |
| JP | 2015-092845 | 5/2015 | |

OTHER PUBLICATIONS

Japanese Office Action with English translation, dated Apr. 14, 2020, 6 pages.
European Search Report dated Sep. 23, 2019, 8 pages.

* cited by examiner

WORK EQUIPMENT WITH CONTAINER LIFTING DEVICE

TECHNICAL FIELD

The present invention relates to work equipment, and in particular to work equipment such as a lawn mower and a road sweeper.

BACKGROUND ART

A lawn mower is provided with a mowing blade for mowing the lawn, and a grass container (grass collecting container) for containing the mowed grass clippings. When the grass container has become full, the mowed grass clippings in the grass container are discarded. In a certain lawn mower, the grass container is detachable from the mower main body so that the detached grass container may be transported to a prescribed disposal area to discard the grass clippings. See Patent Document 1, for instance. In another lawn mower, the grass container can be tilted with respect to the mower main body so that the mowed grass clippings can be discarded from the grass container by tilting the grass container. See Patent Documents 2 and 3, for instance.

Patent Document 1: JP2010-148403A
Patent Document 2: JP2003-189718A
Patent Document 3: JP2015-92845A

SUMMARY OF THE INVENTION

Task to be Accomplished by the Invention

In the case where the grass container is to be transported to an area for discarding the mowed grass clippings, the grass container can be transported by an operator if the grass container is not bulky or heavy, but transportation equipment such as a cart may be required if the grass container is bulky or heavy. Therefore, the transportation of the grass container detached from the machine main body requires a substantial amount of manual work, and the burden on the operator is undesirably great.

In the case where the grass container is tilted to discard the mowed grass clippings, the operator is not required to transport the grass container, but the lawn mower must travel to the area where the mowed grass clippings are to be discarded or, alternatively, a truck or any other form of hauling equipment is required to be brought beside the lawn mower. In either case, a relatively large piece of equipment is required to travel from one place to another every time mowed grass clippings are required to be discarded, and energy efficiency and work efficiency are both poor.

In view of such a problem of the prior art, a primary object of the present invention is to allow an article collected by work equipment such as a lawn mower, and stored in a container to be transported to a disposable area in an energy efficient and a work efficient way without imposing any undue burden on the operator.

Means to Accomplish the Task

Work equipment according to an embodiment of the present invention comprises: a work equipment main body (20) including a first structural body (22, 28), a first travel unit (24, 26) provided on the first structural body (22, 28), a first travel drive unit (30) for driving the first travel unit (24, 26), a first energy source (32) for supplying energy to the first travel drive unit (30), and a work unit (40); and a container device (70) including a second structural body (72, 88, 92), a second travel unit (74, 76) provided on the second structural body (72, 88, 92), a second travel drive unit (80) for driving the second travel unit (74, 76), a second energy source (112) for supplying energy to the second travel drive unit (80), and a collected article container unit (88) configured to store an article collected by the work unit (40), the container device being detachably connected to the work equipment main body (20) and being configured to travel by itself in a detached state by using the second travel unit (74, 76), wherein the work equipment main body (20) is provided with a container lifting device (130) configured to lift the container device (70) in a connected state to the work equipment main body (20) so as to raise the second travel unit (74, 76) from a ground.

Thereby, the container device (70) can be detached from the work equipment main body (20) and travel to a destination for the collected article by itself so that the collected article can be transported in an energy efficient and a work efficient way without imposing any undue burden on the operator as opposed to the case where the entire work equipment travels to the destination for the collected article.

Further, by lifting the container device (70) relative to the work equipment main body (20) by using the container lifting device (130) so as to raise the second travel unit (74, 76) from the ground, the second travel unit (74, 76) is prevented from interfering with the steering and traveling of the work equipment main body (20) which travels on the first travel unit.

In the above work equipment, preferably, the container lifting device (130) includes a hook member (132) rotatably provided on the first structural body (22, 28) so as to detachably engage an engagement opening (136) provided in the second structural body (72, 88, 92), and a hook actuator (134) configured to rotatively actuate the hook member (132), is configured to displace the second structural body (72, 88, 92) upward relative to the first structural body (22, 28) by rotation of the hook member (132) engaged with the engagement opening (136), and serves as a latch device for selectively connecting the first structural member (22, 28) to the second structural member (72, 88, 92).

Thereby, by means of the hook member (132), the second structural body (72, 88, 92) can be latched to the first structural body (22, 28) at the same time as the second structural body (72, 88, 92) is lifted.

In the above work equipment, preferably, the first structural member (22, 28) or the second structural member (72, 88, 92) is provided with a connection detection unit (138) configured to detect a positioning of the second structural member (72, 88, 92) suitable for connection with the first structural member (22, 28), and the hook actuator (134) is configured to rotatively drive the hook member (132) into engagement with the engagement opening (136) when the connection detection unit (138) has detected the positioning of the second structural member (72, 88, 92) suitable for connection with the first structural member (22, 28).

Since the lifting action and the latching action of the hook member (132) is performed after the connection detection unit (138) has detected the positioning of the second structural member (72, 88, 92) suitable for connection with the first structural member (22, 28), the lifting action and the latching action of the hook member (132) can be performed in a reliable manner.

In the above work equipment, preferably, the connection detection unit (138) is provided in each of a plurality of locations in the first structural member (22, 28) or the second structural member (72, 88, 92), and the hook actuator (134) is configured to rotatively drive the hook member (132) into engagement with the engagement opening (136) when all of the connection detection units (138) have detected the positioning of the second structural member (72, 88, 92) suitable for connection with the first structural member (22, 28).

Since the lifting action and the latching action of the hook member (132) is performed only when all of the connection detection units (138) have detected the positioning of the second structural member (72, 88, 92 suitable for connection with the first structural member (22, 28), the lifting action and the latching action of the hook member (132) can be performed in an even more reliable manner.

In the above work equipment, preferably, the container device (70) includes an own position detection unit (106) for detecting an own position, and a control unit (104) for controlling the second travel drive unit (80) so as to travel to and back from a prescribed collected article destination based on the own position detected by the own position detection unit (106).

Thereby, the container device (70) can autonomously travel to and back from the collected article destination.

In the above work equipment, preferably, the container device (70) further includes an environment detection unit (122) for detecting an environment surrounding the container device (70), and the control unit (104) is configured to determine a travel route to the collected article destination based on the environment surrounding the container device detected by the environment detection unit (122).

Thereby, the autonomous travel of the container device (70) can be performed while monitoring the surrounding environment so that a collision with an obstacle can be avoided in an effective manner.

In the above work equipment, preferably, the work unit (40) is provided with a cutting blade (48) for mowing, and the collected article is grass clippings.

Thereby, the power equipment can serve as a lawn mower.

Effect of the Invention

Thus, the power equipment of the present invention allows an article collected by the power equipment and stored in a collected article container to be transported in an energy efficient and a work efficient way without imposing any undue burden on the operator. Further, the second travel unit of the container device does not adversely affect the steering and traveling of the work equipment main body traveling on the first travel unit.

BRIEF DESCRIPTION OF THE DRAWING(S)

MODE(S) FOR CARRYING OUT THE INVENTION

Work equipment according to an embodiment of the present invention in the form or a riding mower is described in the following with reference to FIGS. 1 to 7.

The riding lawn mower 10 comprises a mower main body 20 (work equipment main body), and a container device 70 for storing grass clippings (collected article) detachably connected to a rear part of the mower main body 20.

Figure 1:
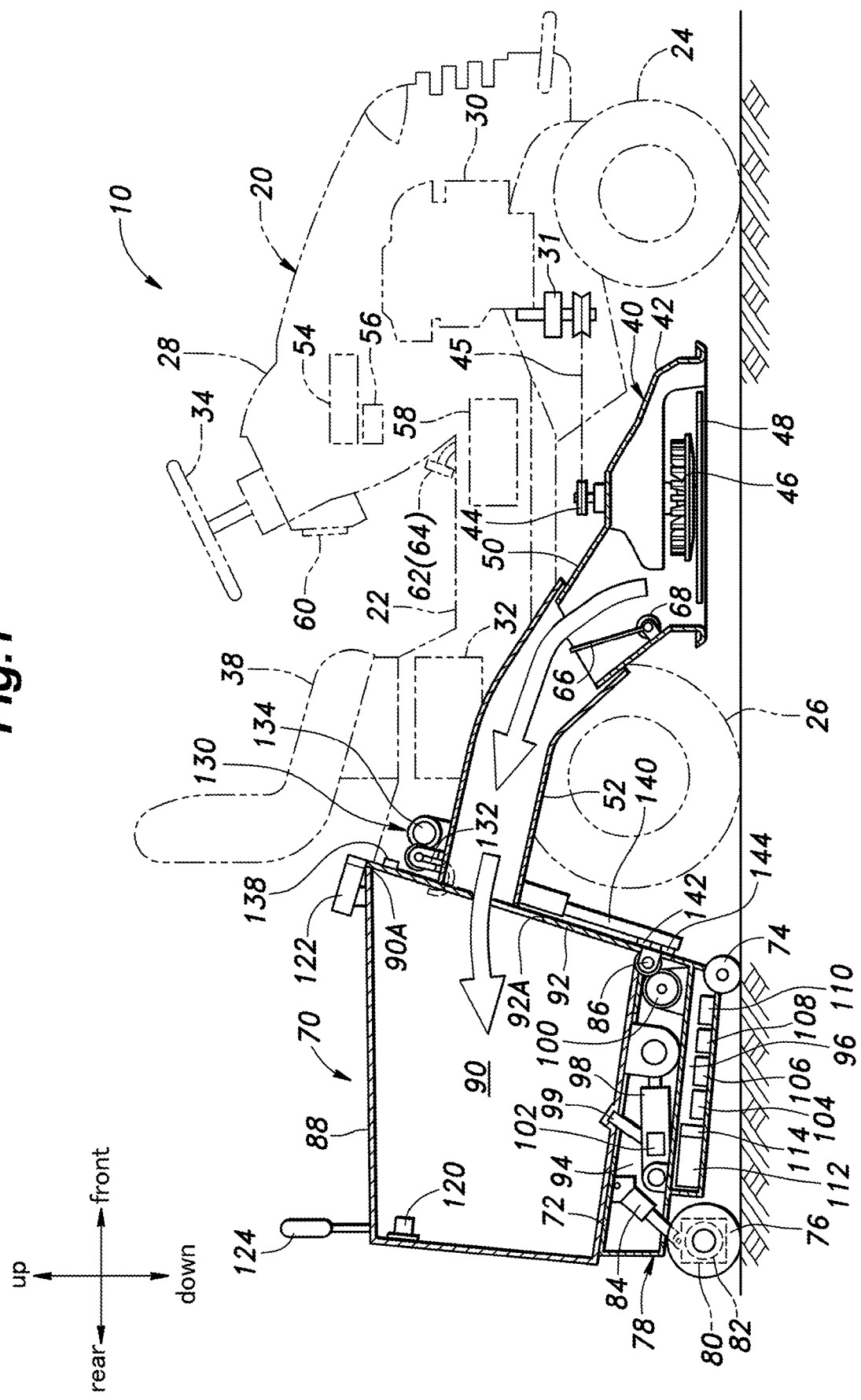
FIG. 1 is a sectional side view of work equipment in the form of a riding lawn mower according an embodiment of the present invention (a sectional side view when a container device for storing grass clippings is lowered)
Figure 2:
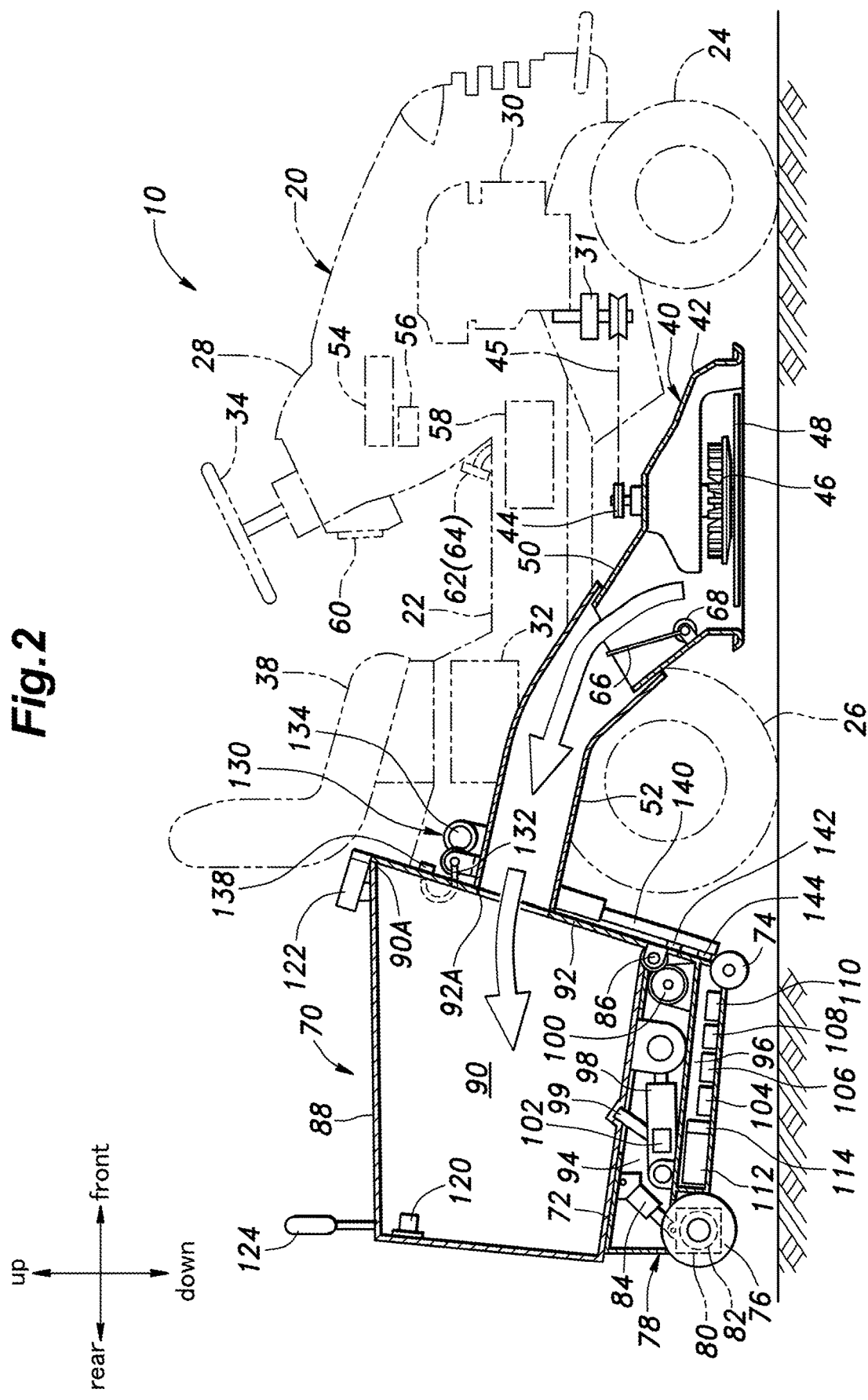
FIG. 2 is a sectional side view of the riding lawn mower according to the present embodiment (a sectional side view when the container device is lifted)

As shown in FIG. 1 and FIG. 2, the mower main body 20 is provided with a main frame 22 forming a structural body for the mower main body 20 (first structural body), a pair of front wheels 24 and a pair of rear wheels 26 (first travel unit) provided on the main frame 22, a front vehicle body 28 provided in a front part of the main frame 22, an internal combustion engine 30 provided in the front vehicle body 28, a fuel supply unit 32 (first energy source) including a fuel tank for storing fuel for the internal combustion engine 30 and a fuel pump provided in the main frame 22, a steering wheel 34 provided in the front vehicle body 28, and a driver's seat 38 provided on the front vehicle body 28. The internal combustion engine 30 not only serves as a first travel drive unit for rotatively driving the front wheels 24 but also as a drive unit for rotatively driving a fan 46 and a cutting blade 48 which will be described hereinafter.

The traveling and braking of the mower main body 20 are controlled by the driver (operator) in the same manner as a conventional riding lawn mower by the operation of an accelerator pedal 62 and a brake pedal 64 provided on the main frame 22.

In a lower part of the main frame 22 is provided a work unit consisting of a cutting blade device (a collection device) 40 in the present embodiment. The cutting blade device 40 includes a housing 42 having an opening facing downward, a blower fan 46 and a cutting blade 48 which are positioned in the housing 42, and fitted on a vertical rotary shaft 44. The rotary shaft 44 is connected to the internal combustion engine 30 via a belt transmission mechanism 45 and a clutch 31 in a power transmitting manner, and is rotatively driven by the internal combustion engine 30 in a selective manner. The housing 42 is provided with a discharge duct 50 for discharging mowed grass clippings. The main frame 22 has a connection duct 52 for connecting the discharge duct 50 to a grass receiving chamber 90 of a container device 70 which will be described hereinafter.

The discharge duct 50 is provided with a shutter 66 for changing the direction of the mowed grass clippings thrown toward the connection duct 52 by the air flow created by the cutting blade 48 and the fan 46, and an electric shutter actuator 68 for changing the angle of the shutter 66.

The mower main body 20 further includes a main body control unit 54 consisting of an electronic control device provided in the front vehicle body 28, a wireless communication unit 56 also provided in the front vehicle body 28 for performing wireless communication with the container device 70, a rechargeable battery 58 provided in the main frame 22, and a operation unit 60 (display unit) provided in the front vehicle body 28. The operation unit 60 may include a LCD panel and a touch panel, or may include switches or the likes, and includes a dump execution button (not shown in the drawings) for dumping or otherwise unloading mowed grass clippings as will be described hereinafter. The battery 58 is charged by a generator (not shown in the drawings) driven by the internal combustion engine 30.

Figure 3:
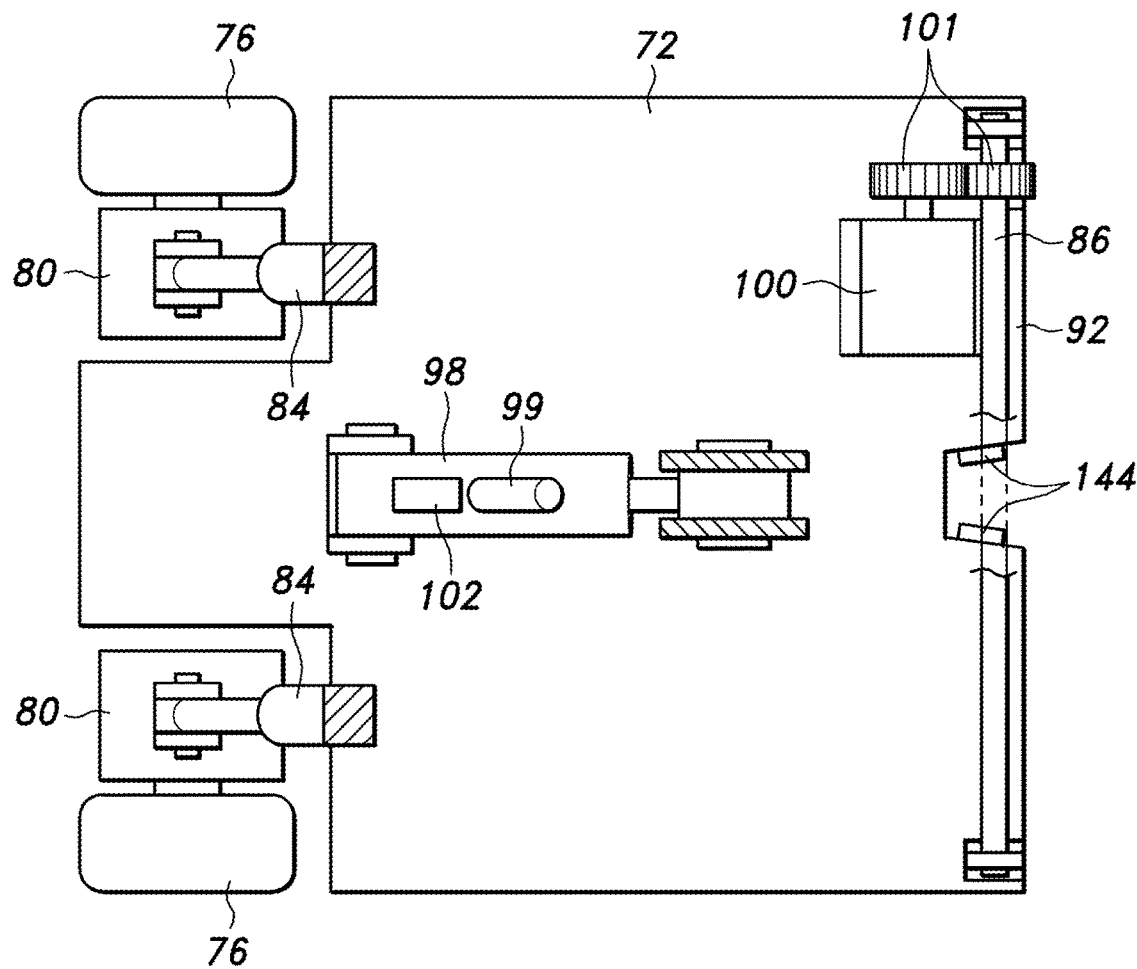
FIG. 3 is a plan view of a machine chamber of the container device of the riding lawn mower according to the present embodiment.

As shown in FIGS. 1 to 3, the container device 70 is provided with an undercarriage 78 including a device frame 72, and a pair of front wheels 74 and a pair of rear wheels 76 (second travel unit) supported by the device frame 72, and a travel drive unit 80 (second travel drive unit) including electric motors for individually rotatively driving the right and left rear wheels 76. The travel drive unit 80 is attached to the device frame 72 via a rear wheel lifting actuator 84 (lift actuator) consisting of an electric linear actuator so that the rear wheels 76 can be moved between a lifted position where the rear wheels are raised from the ground surface and a lowered position where the rear wheels 76 are in contact with the ground surface by the extension and retraction of the rear wheel lifting actuator 84.

The device frame 72 supports a grass container 88 so as to be tiltable (dumping operation) around a support shaft 86 extending laterally in a front part of the device frame 72.

The grass container 88 has a substantially rectangular box shape defining a grass receiving chamber 90 for receiving the mowed grass clippings (collected article) from the cutting blade device 40, and is provided with a content discharge opening 90A extending over an entire front area thereof. The support shaft 86 is fitted with a gate plate 92 so that the gate plate 92 opens and closes the content discharge opening 90A as the support shaft 86 rotates. The grass container 88 and the gate plate 92 have a common center line of rotation (tilting movement) provided by the support shaft 86.

Thus, the container device is provided with a structural body (second structural body) including the device frame 72, the grass container 88 and the gate plate 92.

Figure 4:
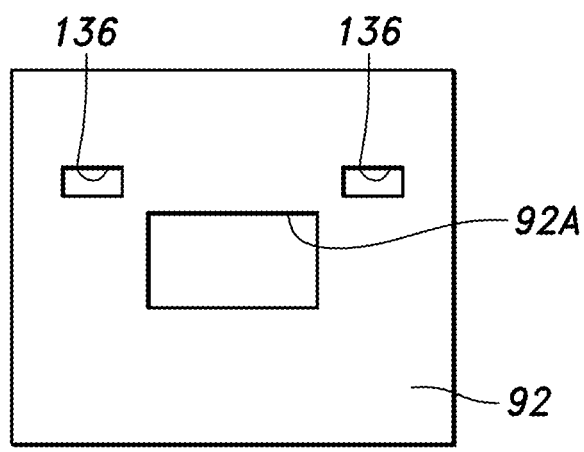
FIG. 4 is a front view of a gate plate of the riding lawn mower according to the present embodiment.

As shown in FIG. 4, the gate plate 92 is formed with a grass inlet opening 92A. As shown in FIG. 2, when the container device 70 connected to the mower main body 20 is in the lifted position, the grass inlet opening 92A aligns with the outlet of the connection duct 52. In addition, the grass container 88 is provided with an exhaust region (not shown in the drawings) which allows air to pass through, but does not allow the grass to pass through.

A pressure sensor 120 is provided in the grass container 88 for detecting the internal pressure of the grass receiving chamber 90 in order to detect the amount of the mowed grass clippings stored in the grass receiving chamber 90. An upper part of the grass container 88 is provided with a camera 122 serving as an environment sensor for detecting the environment surrounding the container device 70 and a warning unit 124 including a red lamp or the like.

The device frame 72 defines a machine chamber 94 and an electric chamber 96 one above the other. The machine chamber 94 accommodates therein a dump actuator 98 for tilting the grass container 88 and a gate actuator 100 for opening and closing the gate plate 92 provided in a bottom part of the grass container 88. The dump actuator 98 is provided with a dump angle sensor 102 for detecting an inclination angle (dump angle) of the grass container 88 with respect to the device frame 72 from the operating state of the dump actuator 98.

The dump actuator 98 is formed by an electric linear actuator, and tilts the grass container 88 between a horizontal position where the bottom surface of the grass container 88 lay flat on the upper surface of the device frame 72 substantially horizontally as shown in FIG. 1, and a tilted position where the grass container 88 is tilted from the horizontal position around the central axial line of the support shaft 86 in clockwise direction to a rear end up posture. The dump actuator 98 is provided with a stopper 99 that abuts against the grass container 88 when the grass container 88 is in the horizontal posture.

The gate actuator 100 is formed by an electric motor, and is connected to the support shaft 86 via a gear train 101 in a power transmitting relationship. The gate actuator 100 rotates the gate plate 92 between a closed position (see FIGS. 1 and 5) for closing the content discharge opening 90A and an open position (see FIG. 6) rotated forward from the closed position around the support shaft 86. In the open position, the gate plate 92 slopes downward from the lower front side of the grass container 88 to serve as a chute for guiding the grass clippings to be unloaded from the grass container 88.

Since both the dump actuator 98 and the gate actuator 100 are provided in the machine chamber 94, these components can be serviced collectively or at the same time.

The electric chamber 96 is a waterproof and dustproof airtight chamber, and accommodates therein a device control unit 104, a GPS 106 (global positioning system, own position detection unit) for detecting the own position of the container device 70, an undercarriage angle sensor 108 using an acceleration sensor or a gyro sensor for detecting the tilt angle (undercarriage angle) of the undercarriage 78 relative to the horizontal plane, a wireless communication unit 110 for communication with the mower main body 20, a rechargeable battery 112, and a battery state of charge sensor 114 for detecting the remaining battery charge of the battery 112. Thus, the electric devices can be centrally managed in a single location of the electric chamber 96, and the electric wiring for these electric devices can be minimized.

The mower main body 20 is provided with a latch device 130 for releasably connecting the container device 70 to the rear of the mower main body 20. The latch device 130 includes hook members 132 rotatable about an axis laterally extending in a rear end part of the main frame 22, and a latch actuator 134 including an electric motor for rotating the hook members 132. The gate plate 92 is formed with an engagement openings 136 with which the hook members 132 can be engaged. The latch actuator 134 is controlled by the main body control unit 54.

The hook members 132 can be rotationally driven by the latch actuator 134 between a release position shown in FIG. 1 and a connect position shown in FIG. 2, and are configured to engage the engagement openings 136 (see FIG. 4) as the container device 70 travels forward to the coupling position at the rear of the mower main body 20. Then, the hook members 132 are pivoted to the connect position so that the container device 70 is lifted upward with respect to the mower main body 20 while being connected to the mower main body 20. In this raised state of the container device 70, the front wheels 74 and rear wheels 76 are all lifted from the ground so that the front wheels 74 and rear wheels 76 do not affect the steering and traveling of the mower main body 20.

When the container device 70 is connected to the mower main body 20, the device frame 72 is secured to the main frame 22 via the grass container 88 and the gate plate 92 so as to be immobile in the vertical direction.

When the container device 70 is connected to the mower main body 20, the grass container 88 is in the horizontal position, and the gate plate 92 is in the closed position as shown in FIGS. 1 and 2.

In this way, the hook members 132 and the latch actuator 134 serve both as a latch device for selectively connecting the mower main body 20 and the container device 70 to each other, and a lift device for upwardly displacing the container device 70 relative to the mower main body 20.

The main frame 22 is provided with a pair of detection switches 138 (connection detection unit) that are located on either side part thereof, and configured to detect the positioning of the container device 70 at the coupling position or the position suitable for coupling with the mower main body 20 by being pressed by the gate plate 92. Once the detection switches 138 have both detected that the container device 70 has arrived at the coupling position, the latch actuator 134 rotates the hook members 132 from the release position to the connect position. The detection switches 138 may also be provided on the side of the gate plate 92.

A connection member 140 extends downward from the connection duct 52 at the rear end of the main frame 22. The lower end of the connection member 140 faces the front face of the device frame 72 in the raised state of the container device 70, and a signal line connector 142 is provided between the opposing parts of these two components to connect signal lines of the mower main body 20 with corresponding signal lines of the container device 70. In addition, between the connection member 140 and the device frame 72 is provided a power line connector 144 for connecting the battery 58 to the battery 112 in the raised state of the container device 70.

Figure 7:
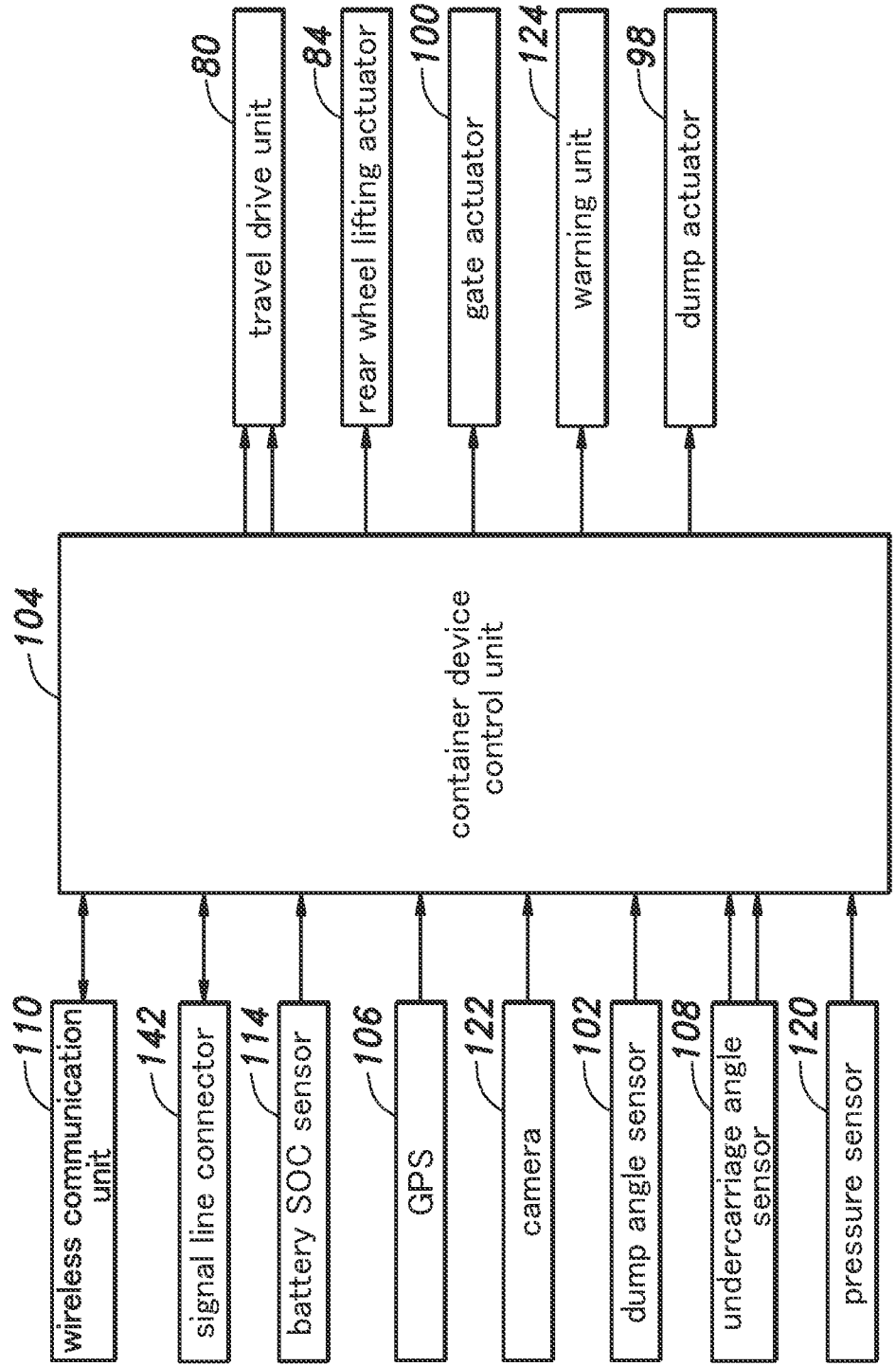
FIG. 7 is a block diagram of a control system of the riding lawn mower according to the present embodiment.

The container device control unit 104 is an electronic control device provided with a processor, and as shown in FIG. 7, the container device control unit 104 is configured to receive signals from the dump angle sensor 102, the GPS 106, the undercarriage angle sensor 108, the battery state of charge sensor 114, the pressure sensor 120, and the signal line connector 142, and a video signal from the camera 122 to control the operation of the travel drive unit 80, the rear wheel lifting actuator 84, the gate actuator 100, and the warning unit 124. Further, a wireless communication unit 110 is connected to the container device control unit 104.

The battery 112 is a power source for all of the of the electric units of the container device 70 including the travel drive unit 80, and can be charged by the battery 112 via the power line connector 144 while being monitored by the battery state of charge sensor 114.

The mode of operation of the riding lawn mower 10 having the above described configuration is described in the following.

As shown in FIG. 2, the mowing operation is performed while the container device 70 is connected to the mower main body 20 and is raised, and the rear wheels 76 are raised by the rear wheel lifting actuator 84. The mower main body 20 travels by means of the rear wheels 26 that are powered by the internal combustion engine 30. With the clutch 31 engaged, the internal combustion engine 30 rotates the fan 46 and the cutting blade 48. During the mowing operation, the front wheels 74 and the rear wheels 76 of the container device 70 are raised and not grounded so the front wheels 74 and the rear wheels 76 do not impede the traveling and steering of the mower main body 20 of the riding lawn mower 10.

In this case, since the entire container device 70 is raised relative to the mower main body 20, and the rear wheels 76 are raised relative to the device frame 72, even when the rear wheels 76 which are drive wheels have a larger diameter than the front wheels, the rear wheels 76 are not grounded. Therefore, the required lift of the container device 70 as a whole can be minimized.

The grass clippings mowed by the cutting blade 48 are carried by the air flow generated by the rotation of the cutting blade 48 and the fan 46, and is directed from the housing 42 to the connection duct 52 via the discharge duct 50 to be received by the grass receiving chamber 90 via the grass inlet opening 52A. As the mowing operation progresses, the grass clippings stored in the grass receiving chamber 90 increases so that the volume of the exhaust region diminishes owing to the deposition of grass clippings therein. As the volume of the exhaust region defined in an upper part of the grass receiving chamber 90 diminishes, the inner pressure of the grass receiving chamber 90 rises.

Once the grass clippings accumulate in the grass receiving chamber 90 to an almost full level, the inner pressure of the grass receiving chamber 90 detected by the pressure sensor 120 reaches a prescribed value, and a signal indicating this state is transmitted to the main body control unit 54 via the signal line connector 142. As a result of the transmission of this signal, the need for the disposal of the grass clippings is displayed on the operation unit 60.

When a disposal execution button (not shown in the drawings) provided on the operation unit 60 is operated under this condition, the travel of the mower main body 20 is stopped, and the clutch 31 is disengaged to stop the rotation of the fan 46 and the cutting blade 48 under the control of the main body control unit 54.

Simultaneously as this stopping operation, the rear wheels 76 are lowered to the lowered position thereof by the rear wheel lifting actuator 84, and the hook members 132 are rotated to the release position shown in FIG. 1 by the latch actuator 134. As a result, the container device 70 is grounded via the front wheels 74 and the rear wheels 76 as shown in FIG. 1 to be ready for detachment from the mower main body 20.

Following the rotation of the hook members 132 to the release position, the container device 70 moves rearward from the mower main body 20 by a prescribed distance as the travel drive unit 80 drives the rear wheels 76 under the control of the device control unit 104 so that the container device 70 becomes detached from the mower main body 20.

Figure 5:
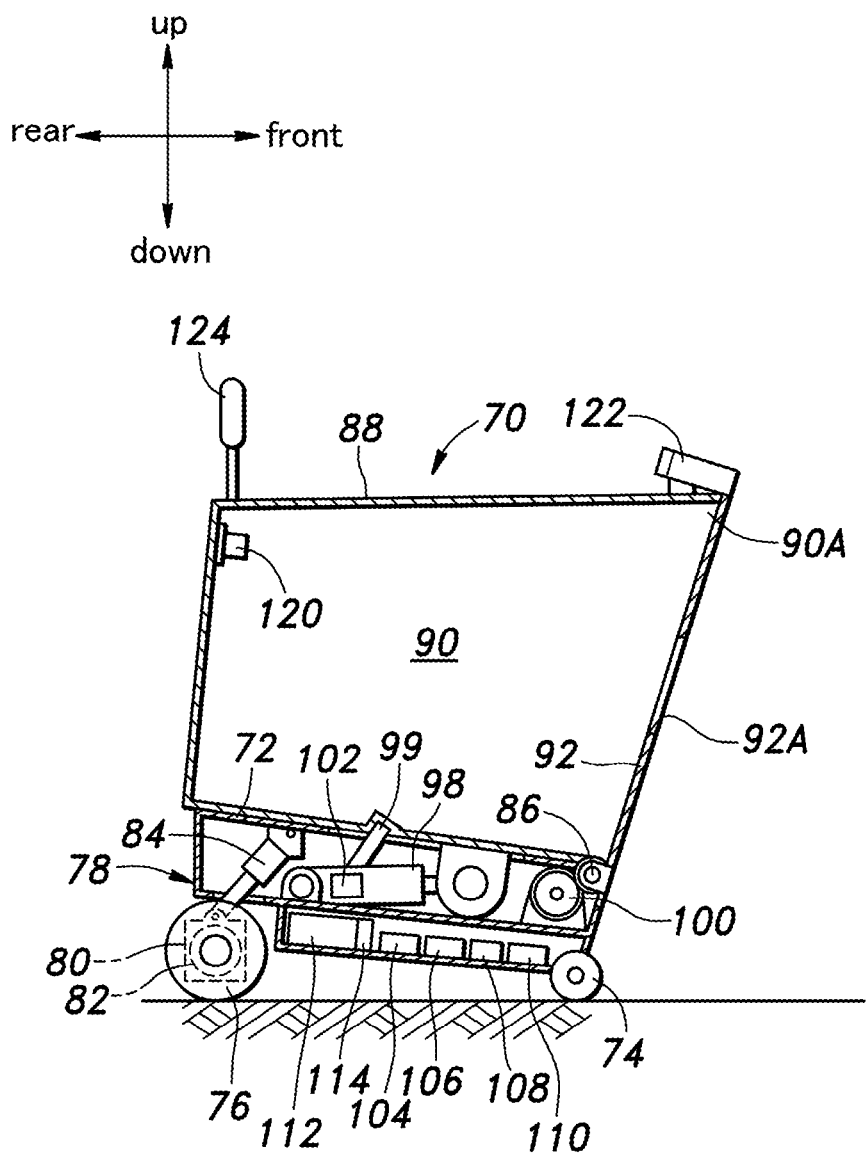
FIG. 5 is a sectional side view of the container device of the riding lawn mower according to the present embodiment when detached from the riding lawn mower.

Upon completion of the detachment, the device control unit 104 acquires information on the own position detected by the GPS 106 as a base position, and determines a travel route from the base position to the grass disposal area which is a predetermined collected article destination. The electric motors 82 for the travel drive unit 80 are individually controlled by the device control unit 104 according to the travel route. As a result, the container device 70 as shown in FIG. 5 travels autonomously to the disposal area along the travel route by itself. The change in the travel direction of the container device 70 including a turning maneuver is effected by the difference in the driving speeds of the right and left electric motors 82 without requiring any special steering device.

Figure 6:
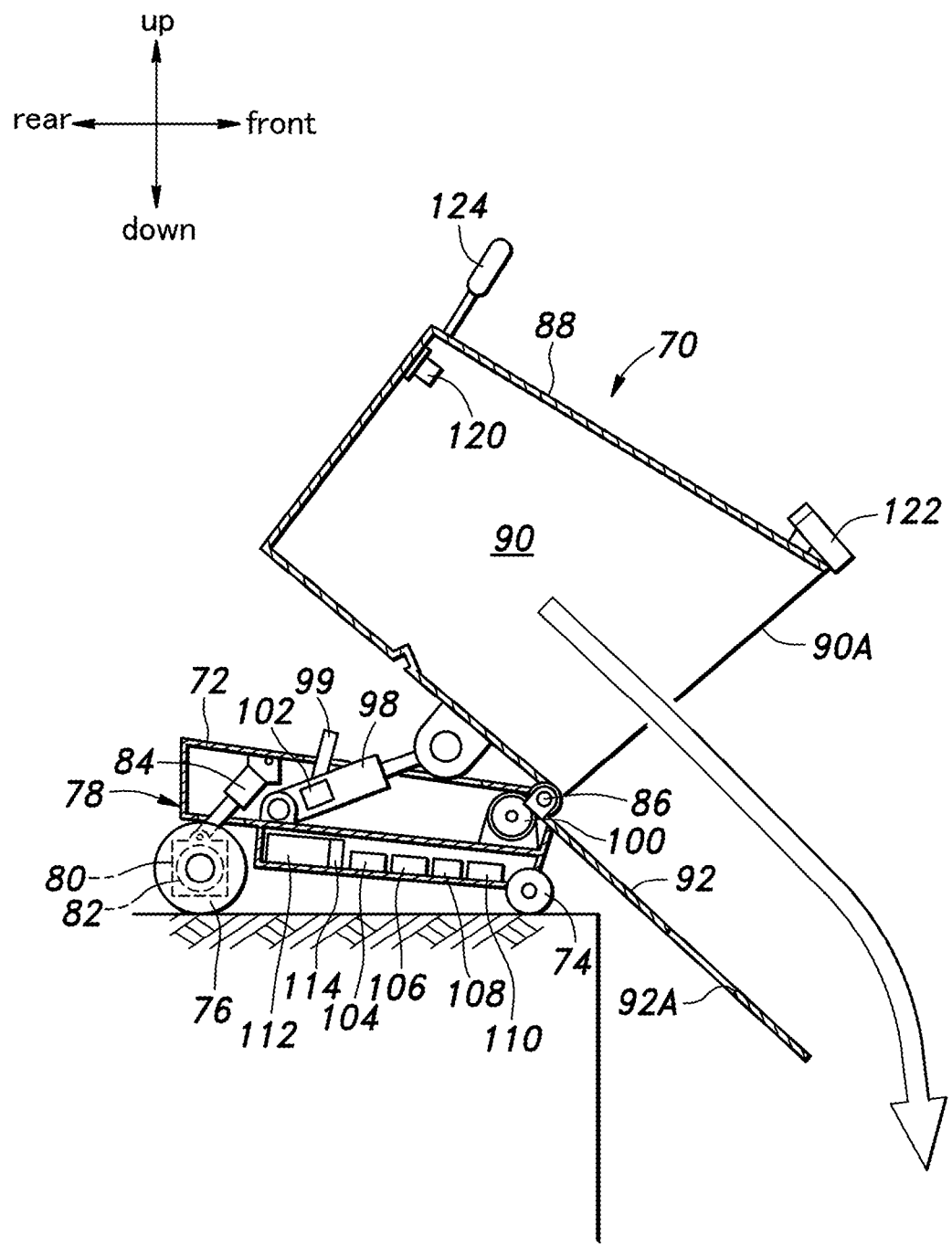
FIG. 6 is a sectional side view of the container device of the riding lawn mower according to the present embodiment when dumping the grass.

Upon arriving at the disposal area, the container device 70 comes to a stop, and under the control of the device control unit 104, the dump actuator 98 is driven so as to tilt the grass container 88 into a tail end up posture, and the gate actuator 100 is driven so as to move the gate plate 92 to the open position as shown in FIG. 6. As a result, the grass clippings stored in the grass container 88 are dumped from the content discharge opening 90A with the gate plate 92 serving as a chute, and are disposed of.

The grass clippings in the grass container 88 are unloaded by dumping in a work efficient manner. Furthermore, since the gate plate 92 is automatically opened and closed under power, and the gate plate 92 in the open position conveniently functions as a chute for unloading the grass clippings from the grass container 88.

Upon elapsing of a certain time period following the placing of the gate plate 92 at the open position, the device control unit 104 judges the completion of the disposal of the grass clippings, and controls the dump actuator 98 so as to reverse the movement thereof to restore the grass container 88 to the original horizontal position, and the gate actuator 100 so as to reverse the movement thereof to move the gate plate 92 to the original closed position. As a result, the container device 70 returns to the state shown in FIG. 5. The timing for bringing the grass container 88 to the horizontal position and closing the gate plate 92 may be determined by monitoring the state of dumping the grass clippings with the video signal (image signal) from the camera 122.

Thereafter, according to the own position of the container device 70 detected by the GPS 106, the container device 70 autonomously travels back to the base position along the travel route by itself as shown in FIG. 5 by individually driving the right and left rear wheels 76 via the device control unit 104.

The container device 70 thus autonomously travels to and returns from the grass disposal area.

During the time in which the container device 70 autonomously travels to and from the grass disposal area, the device control unit 104 monitors the environment surrounding the container device 70 according to the video signal from the camera 122, and upon detecting an obstacle or the like in the travel route, changes the travel route to or from the disposal area so as to avoid a collision with the obstacle or the like. Thereby, a collision with the obstacle or the like can be avoided. The video signal of the camera 122 is transmitted from the wireless communication unit 110 of the device control unit 104 to the wireless communication unit 56 of the mower main body 20. The environment surrounding the container device 70 may be displayed on the operation unit 60.

Upon arrival at the base position, the container device 70 advances toward the mower main body 20 from the rear by a certain distance until the detection switches 138 are pressed by the container device 70. As a result, under the control of the main body control unit 54, the latch actuator 134 is driven so as to rotate the hook members 132 from the release position to the connect position (latched position), and under the control of the device control unit 104, the rear wheel lifting actuator 84 are driven so as to lift the rear wheels 76 to the raised position. As a result, the container device 70 becomes connected to the mower main body 20, and lifted to the raised position as shown in FIG. 2, and is ready for resuming the mowing operation.

In the case where the container device 70 has become unable to travel due to any obstacle on the way to or back from the grass disposal area, or any failure has prevented the dumping operation of the grass container or the opening or closing of the gate plate 92, the operator may be informed of this by the warning unit 124 optically or acoustically.

In the case where the video signal of the camera 122 is transmitted from the wireless communication unit 110 of the device control unit 104 to the wireless communication unit 56 of the mower main body 20, and the surrounding environment of the container device 70 is displayed on the operation unit 60, it may be arranged such that the container device 70 is remotely controlled from the mower main body 20 via wireless communication with the aid of the screen display of the surrounding environment of the container device 70.

As discussed above, since the disposal of the grass clippings is conducted by the container device 70 which is detached from the mower main body 20 and travels to the grass disposal area, the disposal of the grass clippings can be accomplished without unduly burdening the operator in an energy efficient and a work efficient manner as opposed to the case where the entire lawn mower 10 travels to the grass disposal area.

Two or more (a plurality of) container devices 70 may be employed in turn for each mower main body 20. In such a case, while one of the container devices 70 is traveling to the grass disposal area, the other container device 70 may be connected to the mower main body 20 so that the lawn mowing operation may be continued. Thereby, the time efficiency of the lawn mowing operation can be improved.

The present invention has been described in terms of a specific embodiment, but is not limited by such an embodiment, and can be modified in various ways without departing from the spirit of the present invention as can be appreciated by a person skilled in the art.

For example, the detection of the amount of mowed grass clippings received in the grass receiving chamber 90 is not limited to using a pressure sensor 120, but may also be performed by using a level gauge that detects the height of the pile of the mowed grass clippings received in the grass receiving chamber 90 or a weight sensor that measures the weight of the mowed grass clippings received in the grass receiving chamber 90. The travel of the work equipment main body 20, and the rotation of the fan 46 and the cutting blade 48 may be effected by using individual electric motors. Instead of lifting both the container device 70 and the rear wheels 76, either the container device 70 or the rear wheels 76 alone may be lifted. The travel unit for the mower main body 20 and the container device 70 is not limited to those using wheels, but may be those using crawlers. In the case where the mower main body 20 and the container device 70 communicate with each other via wireless communication, the entire control including the control of the container device 70 may be performed by the main body control unit 54 by sending control commands from the mower main body 20 to the container device 70 via wireless communication.

The work equipment of the present invention is not limited to a riding lawn mower 10, but may also be other forms of work equipment such as a road sweeper that stores an article collected by the work unit thereof.

The various components used in the illustrated embodiment are not entirely essential for the present invention, but may be partly omitted or substituted without departing from the spirit of the present invention.

---

GLOSSARY OF TERMS

10: riding lawn mower (work equipment)
20: mower main body (work equipment main body
22: main body frame
24: front wheels (first travel unit)
26: rear wheels (first travel unit)
28: front vehicle body
30: internal combustion engine (first travel drive unit)
31: clutch
32: fuel supply unit (first energy source)

| GLOSSARY OF TERMS | |
|---|---|
| 34: steering wheel | 38: driver's seat |
| 40: cutting blade device (work unit) | 44: rotary shaft |
| 45: belt transmission mechanism | 46: fan |
| 48: cutting blade | 50: discharge duct |
| 52: connection duct | 52A: grass inlet opening |
| 54: main body control unit | 56: wireless communication unit |
| 58: battery | 60: operation unit |
| 66: shutter | 68: shutter actuator |
| 70: grass container device (collected article storing container) | |
| 72: device frame | 74: front wheel (second travel unit) |
| 76: rear wheel (second travel unit) | 78: undercarriage |
| 80: travel drive unit (second travel drive unit) | |
| 84: rear wheel lifting actuator (linear actuator, lifting device) | |
| 86: support shaft | |
| 88: grass container (collected article container) | |
| 90: grass receiving chamber (collected article receiving chamber) | |
| 90A: collected article discharge opening | |
| 92: gate plate (opening/closing door) | 92A: grass inlet opening |
| 94: machine chamber | 96: electric chamber |
| 98: dump actuator (tilt drive unit) | 99: stopper |
| 100: gate actuator (opening and closing drive unit) | |
| 101: gear train | 102: dump angle sensor |
| 104: container device control unit | 106: GPS (own position detection unit) |
| 108: undercarriage angle sensor | 110: wireless communication unit |
| 112: battery (second energy source) | 114: battery state of charge sensor |
| 120: pressure sensor | |
| 122: camera (environment detection unit) | |
| 124: warning unit | 130: latch device (container lifting device) |
| 132: hook member | 134: latch actuator (hook actuator) |
| 136: engagement opening | |
| 138: detection switch (connection detection unit) | |
| 140: connection member | 142: signal line connector |
| 144: power line connector | |

The invention claimed is:

1. Work equipment, comprising:
a work equipment main body including a first structural body, a first travel unit provided on the first structural body, a first travel drive unit for driving the first travel unit, a first energy source for supplying energy to the first travel drive unit, and a work unit; and
a container device including a second structural body, a second travel unit provided on the second structural body, a second travel drive unit for driving the second travel unit, a second energy source for supplying energy to the second travel drive unit, and a collected article container unit configured to store an article collected by the work unit, the container device being detachably connected to the work equipment main body and being configured to travel by itself in a detached state by using the second travel unit;
wherein the work equipment main body is provided with a container lifting device configured to lift the container device in a connected state to the work equipment main body so as to raise the second travel unit from a ground.

2. The work equipment according to claim 1, wherein the container lifting device includes a hook member rotatably provided on the first structural body so as to detachably engage an engagement opening provided in the second structural body, and a hook actuator configured to rotatively actuate the hook member, is configured to displace the second structural body upward relative to the first structural body by rotation of the hook member engaged with the engagement opening, and serves as a latch device for selectively connecting the first structural body to the second structural body.

3. The work equipment according to claim 2, wherein the first structural body or the second structural body is provided with a connection detection unit configured to detect a positioning of the second structural body suitable for connection with the first structural body, and
the hook actuator is configured to rotatively drive the hook member into engagement with the engagement opening when the connection detection unit has detected the positioning of the second structural body suitable for connection with the first structural body.

4. The work equipment according to claim 3, wherein the connection detection unit is provided in each of a plurality of locations in the first structural body or the second structural body, and
the hook actuator is configured to rotatively drive the hook member into engagement with the engagement opening when all of the connection detection units have detected the positioning of the second structural body suitable for connection with the first structural body.

5. The work equipment according to claim 1, wherein the container device includes an own position detection unit for detecting an own position, and a control unit for controlling the second travel drive unit so as to travel to and back from a prescribed collected article destination based on the own position detected by the own position detection unit.

6. The work equipment according to claim 5, wherein the container device further includes an environment detection unit for detecting an environment surrounding the container device, and the control unit is configured to determine a travel route to the collected article destination based on the environment surrounding the container device detected by the environment detection unit.

7. The work equipment according to claim 1, wherein the work unit is provided with a cutting blade for mowing, and the collected article is grass clippings.

8. The work equipment according to claim 2, wherein the container device includes an own position detection unit for detecting an own position, and a control unit for controlling the second travel drive unit so as to travel to and back from a prescribed collected article destination based on the own position detected by the own position detection unit.

9. The work equipment according to claim 8, wherein the container device further includes an environment detection unit for detecting an environment surrounding the container device, and the control unit is configured to determine a travel route to the collected article destination based on the environment surrounding the container device detected by the environment detection unit.

10. The work equipment according to claim 3, wherein the container device includes an own position detection unit for detecting an own position, and a control unit for controlling the second travel drive unit so as to travel to and back from a prescribed collected article destination based on the own position detected by the own position detection unit.

11. The work equipment according to claim 10, wherein the container device further includes an environment detection unit for detecting an environment surrounding the container device, and the control unit is configured to determine a travel route to the collected article destination based on the environment surrounding the container device detected by the environment detection unit.

12. The work equipment according to claim 4, wherein the container device includes an own position detection unit for detecting an own position, and a control unit for controlling the second travel drive unit so as to travel to and back from a prescribed collected article destination based on the own position detected by the own position detection unit.

13. The work equipment according to claim 12, wherein the container device further includes an environment detection unit for detecting an environment surrounding the container device, and the control unit is configured to determine a travel route to the collected article destination based on the environment surrounding the container device detected by the environment detection unit.

14. The work equipment according to claim 2, wherein the work unit is provided with a cutting blade for mowing, and the collected article is grass clippings.

15. The work equipment according to claim 3, wherein the work unit is provided with a cutting blade for mowing, and the collected article is grass clippings.

16. The work equipment according to claim 4, wherein the work unit is provided with a cutting blade for mowing, and the collected article is grass clippings.

17. The work equipment according to claim 5, wherein the work unit is provided with a cutting blade for mowing, and the collected article is grass clippings.

18. The work equipment according to claim 6, wherein the work unit is provided with a cutting blade for mowing, and the collected article is grass clippings.

* * * * *